United States Patent
Lape, Sr. et al.

(10) Patent No.: US 7,144,046 B1
(45) Date of Patent: Dec. 5, 2006

(54) RV SEWER SECURITY BRACKET

(76) Inventors: James D. Lape, Sr., 14208 El Camino Real, Ocean Springs, MS (US) 39564; Beverly Lape, 14208 El Camino Real, Ocean Springs, MS (US) 39564

( * ) Notice: Subject to any disclaimer, the term of this patent is extended or adjusted under 35 U.S.C. 154(b) by 98 days.

(21) Appl. No.: 11/041,144

(22) Filed: Jan. 24, 2005

(51) Int. Cl.
*F16L 43/00* (2006.01)

(52) U.S. Cl. .................................................. 285/180

(58) Field of Classification Search ............... 285/180, 285/135.4, 190, 179.1, 179
See application file for complete search history.

(56) References Cited

U.S. PATENT DOCUMENTS

| | | | | |
|---|---|---|---|---|
| 696,230 | A | * | 3/1902 | Fielding ..................... 285/180 |
| 715,542 | A | * | 12/1902 | Blumer ...................... 285/180 |
| 1,202,960 | A | * | 10/1916 | Bonneau .................... 285/180 |
| 2,326,213 | A | * | 8/1943 | Gorrien ..................... 285/180 |
| 2,589,136 | A | * | 3/1952 | Ralston ..................... 285/180 |
| 2,654,618 | A | * | 10/1953 | Kurth ........................ 285/180 |
| 4,373,751 | A | * | 2/1983 | Schober et al. ............ 285/180 |
| 4,758,027 | A | | 7/1988 | Todd |
| 4,796,926 | A | | 1/1989 | Rapsilver |
| 5,330,233 | A | | 7/1994 | Kress |
| 5,383,494 | A | | 1/1995 | Caine |
| 5,417,460 | A | | 5/1995 | Lunder |
| 6,240,986 | B1 | | 6/2001 | Berkes et al. |

* cited by examiner

*Primary Examiner*—David Bochna
(74) *Attorney, Agent, or Firm*—George L. Williamson (57) ABSTRACT

Apparatus for a security bracket for locking a sewer discharge hose for a recreational vehicle to the inlet pipe of the septic tank such as might be used at an RV sewer dumping station at a roadside park. The apparatus eliminates spillage and secures the sewer discharge hose to the inlet pipe of the septic pipe so as to eliminate spillage and the loss of sewer gases from escaping to the air. The apparatus discloses a bracket connected at its upper surface to the elbow of the sewer hose elbow and at its lower end to the inlet to the septic tank. A clamp secures the bracket to the septic tank inlet.

5 Claims, 7 Drawing Sheets

RV SEWER SECURITY BRACKET

BACKGROUND OF THE INVENTION

1. Field of the Invention

The present invention relates generally to sewer hoses and, more particularly, is concerned with a quick connection fitting for a recreational vehicle(RV) sewer hose.

2. Description of the Prior Art

RV sewer fittings have been described in the prior art; however, none of the prior art devices disclose the unique features of the present invention.

In U.S. Pat. No. 4,758,027 dated Jul. 19, 1988, Todd disclosed an adapter for coupling a flexible corrugated drainpipe to a sewage disposal site inlet which includes a hollow, tubular member having an opened drainpipe and portion adapted to engage threadably an end of a corrugated drainpipe. A hollow adapter member has an opened rear end portion adapted to be inserted into the disposal site inlet, and an opened upstanding front end portion which receives telescopically in a tight-fitting relationship an opened rear end portion of the tubular member to interconnect the two members in fluid communications. A quick release mechanism on the tubular and adapter members enables a user to disassemble the two members by rotating the members axially relative to one another.

In U.S. Pat. No. 5,330,233 dated Jul. 19, 1994, Kress disclosed a heavy attachment for attaching to an end of a drain hose of a recreational vehicle. The attachment is made up of two half cylindrical-shaped halves hinged together which can be pinned in a clamping position around the drain hose adjacent its outlet end with an inch or so of said hose projecting thereby providing an anchor for holding the drain hose in place.

In U.S. Pat. No. 5,417,460, dated May 23, 1995, Lunder disclosed an apparatus for attaching and securing a drain hose to the adapter used with a recreational vehicle ("RV") waste drain assembly or, at the opposite end of the hose, to a sewer fitting used in conjunction with a septic tank or some other type of in or above ground sewer system for receiving drained waste matter. The apparatus comprises a retaining ring, which may include an annular flange formed along one edge, slidably mountable inside the opening at one end of an RV drain hose, for retaining the shape and requisite diameter dimension of the end section of the hose to facilitate its engagement with the adapter or the sewer fitting when those connections are made. The ring is removed before the adapter or the sewer fitting engages the hose opening to enable the hose to contract and form a tight seal with those components.

In U.S. Pat. No. 4,796,926, dated Jan. 10, 1989, Rapsilver disclosed a dump fitting on the discharge end of a sewer hose leading from the waste holding tank of a recreational vehicle which prevents the hose from jumping out of a sewer drain under the influence of effluent being discharged through the hose. The fitting is in the form of an elbow with one limb received in the discharge end of the sewer hose and the other limb forming an outlet for receipt in the sewer drain. The fitting is of sufficient weight to resist the thrust of effluent flowing through the hose and tending to lift its discharge end. The fitting may be a one-part plastic molding or a two-part fit-together molding.

In U.S. Pat. No. 5,383,494 dated Jan. 24, 1995, Caine disclosed an end cap for a flexible hose which includes a depending pivotable member attached to an outer wall. The pivotable member can be swung upwardly between the inner and outer walls of the end cap to secure the end of a flexible hose therein. The end cap is integrally formed such as by molding from a medium density polymeric material such as polyethylene.

In U.S. Pat. No. 6,240,986 B1 dated Jun. 5, 2001, Berkes, et al. disclosed a connector assembly for a sewer pipe system of a recreational vehicle having a holding tank for waste and/or waste water and a discharge pipe having an outlet end through which waste and/or waste water is discharged from the holding tank which utilizes an adapter body having a passageway therethrough and a closure member which is connected to the adapter body for movement across the passageway between closed and open positions. The adapter body is connectable to the discharge pipe of the sewer pipe system and also includes a cavity disposed on one side of the passageway so that the interior of the cavity is in communication with the interior of the passageway. Movement of the closure member between its open and closed positions moves the closure member at least partially into and out of the cavity. In addition, the body of the adapter defines an abutment surface which encircles the passageway therein and is arranged so as to face the closure member when the closure member is in its closed position, and the assembly includes a movable member which biases the closure member toward the abutment surface when the closure member is in its closed position to thereby seal the passageway of the adapter body.

While these fittings may be suitable for the purposes for which they were designed, they would not be as suitable for the purposes of the present invention, as hereinafter described.

SUMMARY OF THE PRESENT INVENTION

The present invention discloses a security bracket for locking a sewer discharge hose for a recreational vehicle to the inlet pipe of a septic tank such as might be used at an RV sewer dumping station at a roadside park. The present invention eliminates spillage and secures the sewer discharge hose to the inlet pipe of the septic tank inlet pipe so as to eliminate spillage and the loss of sewer gases from escaping to the air.

An object of the present invention is to provide a bracket for connecting the sewer hose of a recreational vehicle to the inlet pipe of a septic tank. A further object of the present invention is to protect the environment by preventing spillage and the loss of gases into the air from improperly connected hoses of recreational vehicle sewer hoses. A further object of the present invention is to provide a simple solution for connecting the recreational vehicle sewer hose to the inlet pipe of a septic tank which can be easily and cheaply manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 sewage elbow conduit
14 saddle
16 bracket
18 quick disconnect clamp
20 sewage insert conduit
22 gasket
24 above grade sewer pipe
26 threaded rod
28 knob
30 set screw
32 grade
34 coupling
36 slot

DETAILED DESCRIPTION OF THE PREFERRED EMBODIMENT

Figure 1:
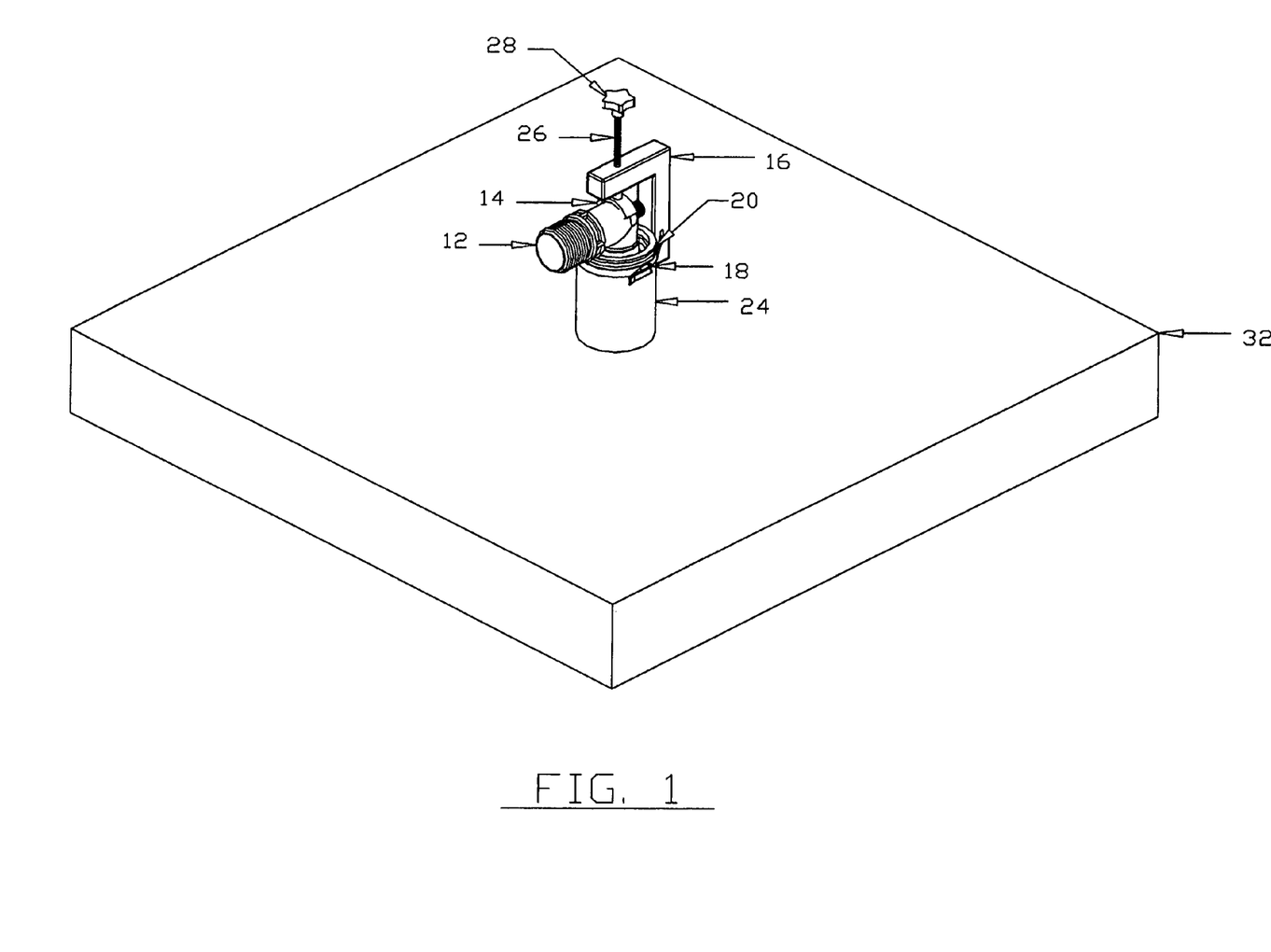
FIG. 1 is a perspective view of the present invention.
Figure 2:
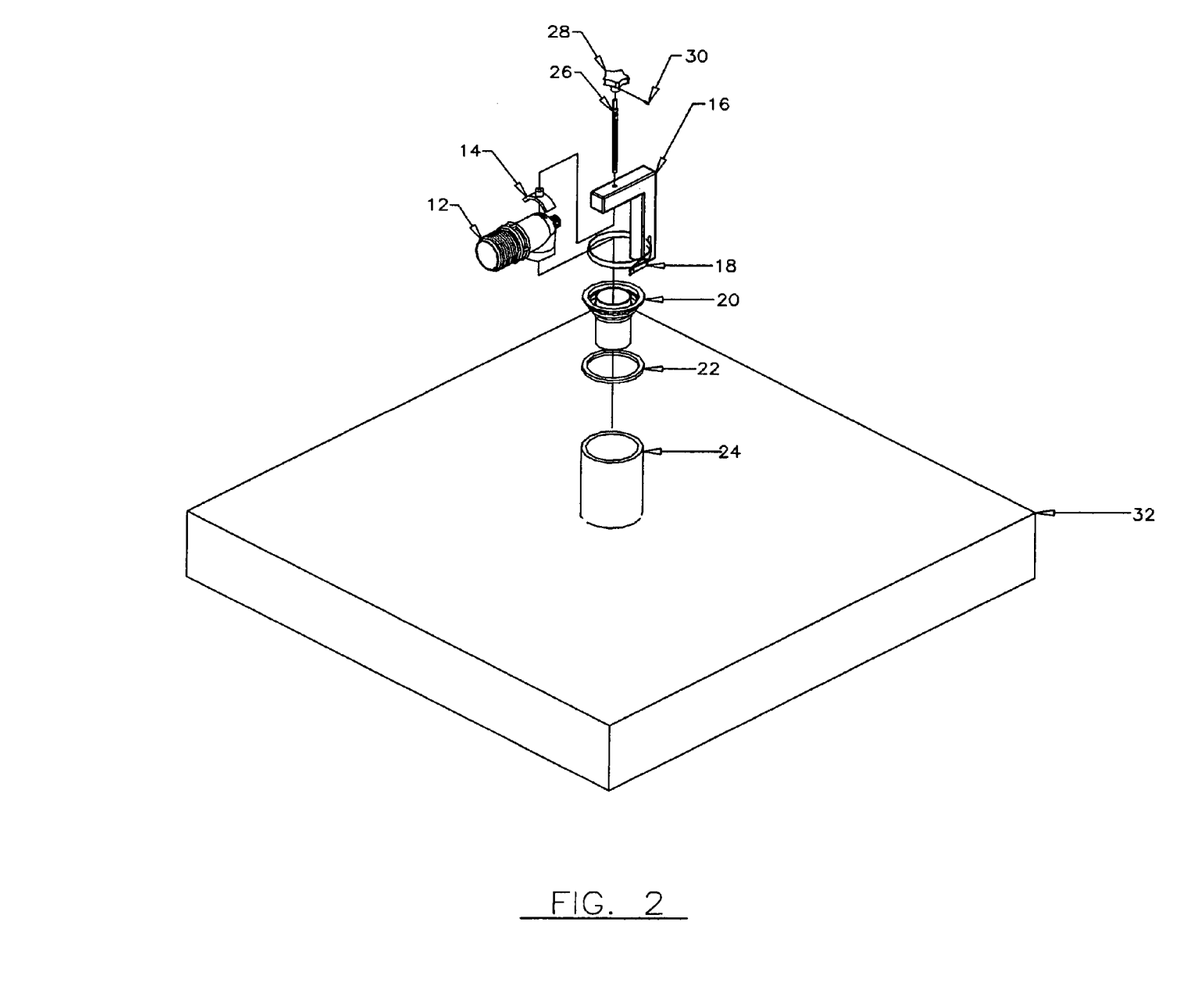
FIG. 2 is an exploded view of the present invention.
Figure 3:
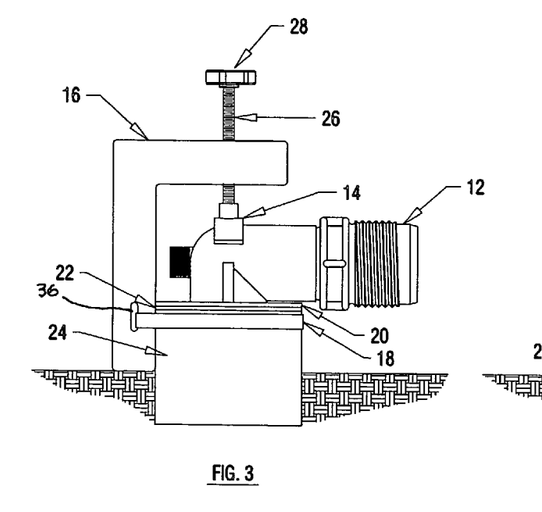
FIG. 3 is a elevation view of the present invention shown in operative connection.
Figure 4:
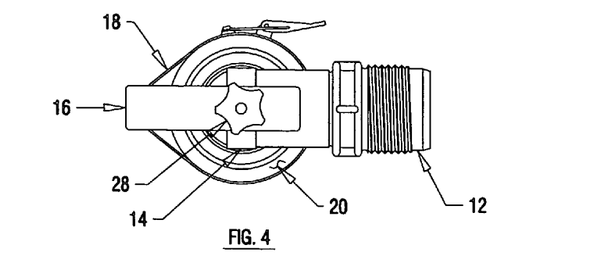
FIG. 4 is a plan view of the present invention shown in operative connection.
Figure 5:
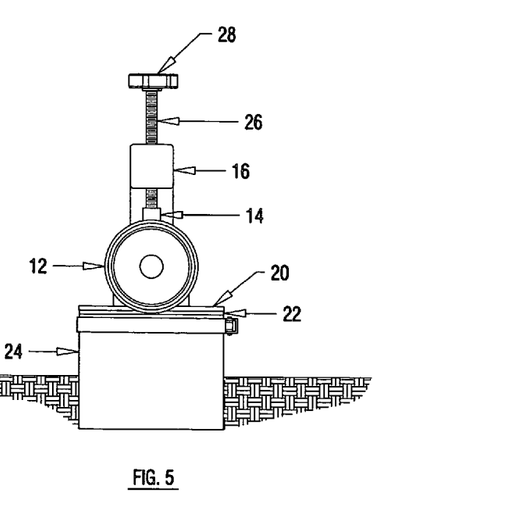
FIG. 5 is a side view of the present invention shown in operative connection.
Figure 6:
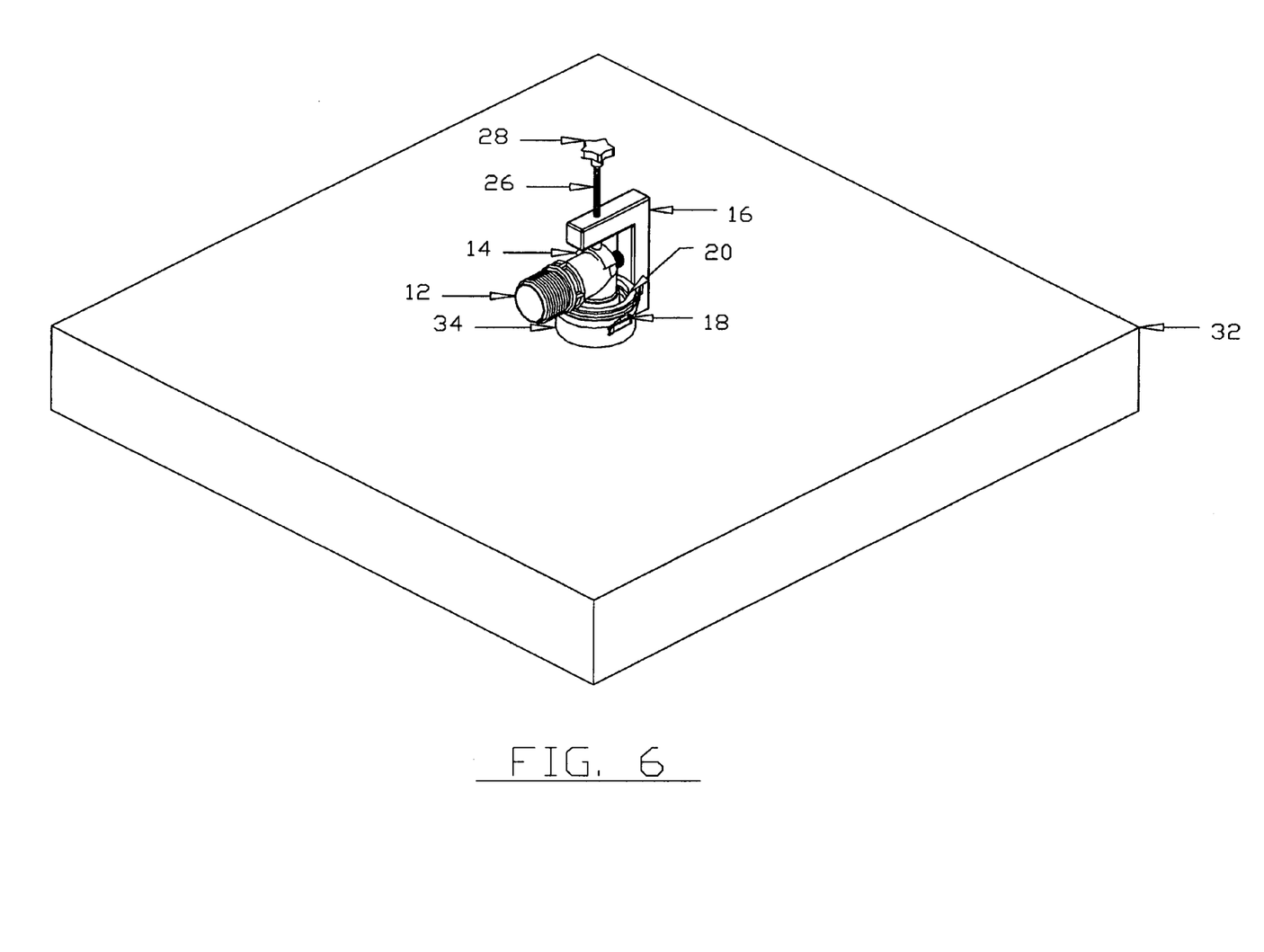
FIG. 6 is a perspective view of a second embodiment of the present invention.
Figure 7:
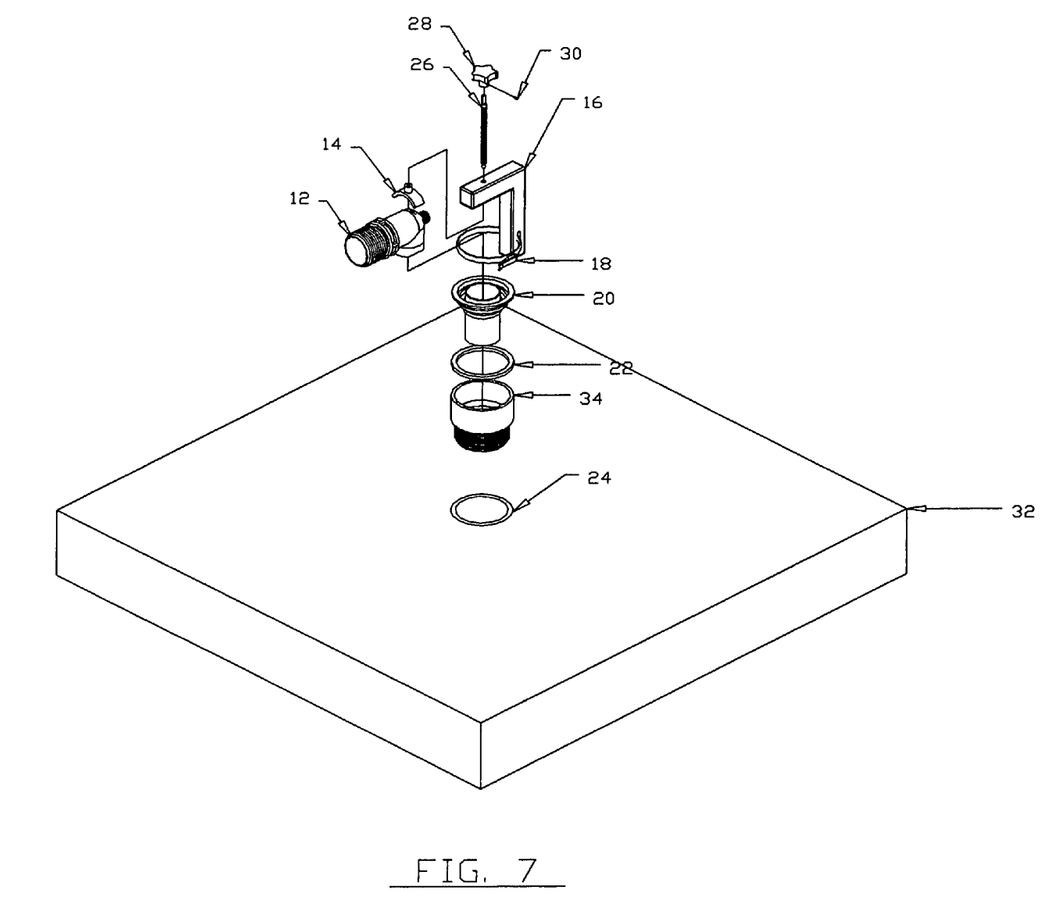
FIG. 7 is an exploded view of a second embodiment of the present invention.
Figure 8:
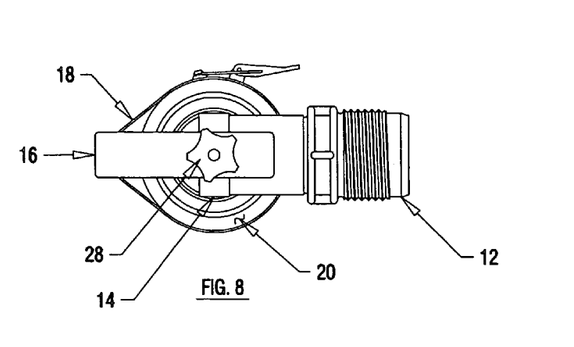
FIG. 8 is a plan view of a second embodiment of the present invention shown in operative connection.
Figure 9:
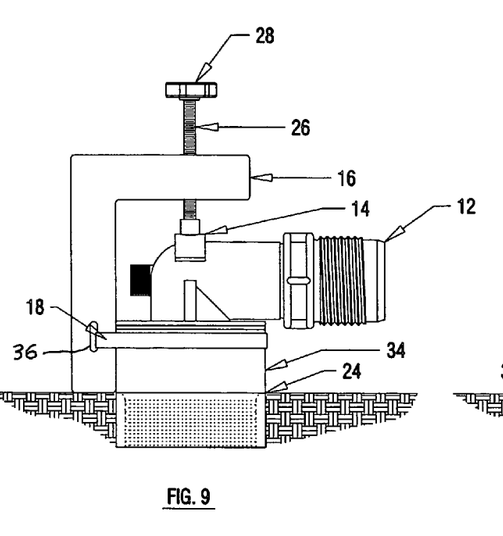
FIG. 9 is an elevation view of a second embodiment of the present invention shown in operative connection.
Figure 10:
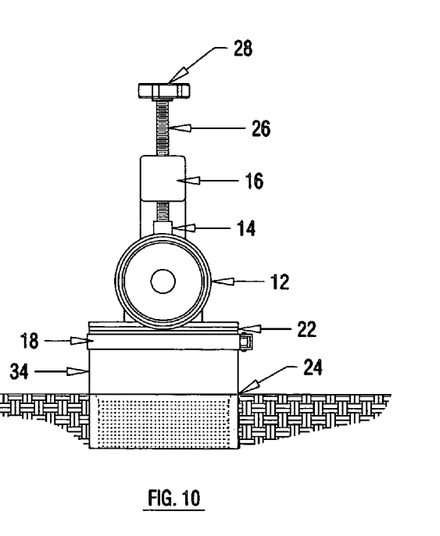
FIG. 10 is a side view of a second embodiment of the present invention shown in operative connection.
Figure 11:
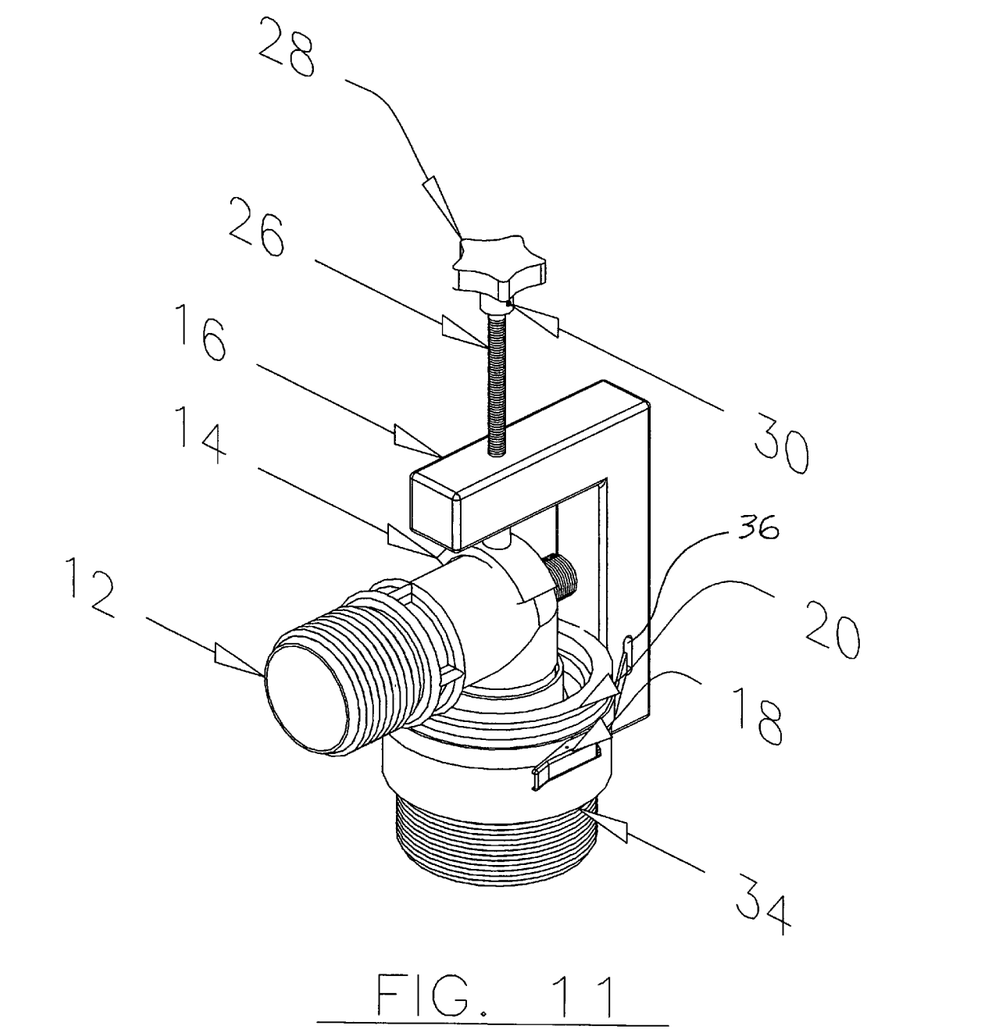
FIG. 11 is a perspective view of a second embodiment of the present invention.

Turning now descriptively to the drawings, in which similar reference characters denote similar elements throughout the several views, wherein FIGS. 1 through 11 illustrate the present invention wherein a security locking mechanism for connecting a recreational vehicle sewer hose to the inlet of a septic tank is disclosed.

Turning to FIGS. 1 through 5, shown therein are various views of the present invention 10. Shown is the present invention 10 having a sewage elbow conduit 12 for receiving the end of the sewer hose from the recreational vehicle having a saddle bracket 14 on its top surface near its rear end. Also shown is the elbow bracket 16 having a top end and a quick connect clamp 18 running through a slot 36 on its lower end for attachment to the sewer pipe 24 and an insert conduit 20 having a gasket 22 thereon for insertion into the above grade sewer pipe 24 and also showing grade 32. The sewer pipe 24 has no adapter or coupling required since it is above grade 32. Shown on the top of bracket 16 is a threaded rod 26 having a knob 28 thereon for turning it to adjustably bias 14 against elbow 12 and a set screw 30 for tightening the knob onto the threaded rod.

Turning to FIGS. 6 through 11, therein are shown views of a second embodiment of the present invention 10 which is similar to the previously described embodiment except that it comprises an extension conduit 34. Shown is the present invention 10 having a sewage elbow conduit 12 for receiving the end of the sewer hose from the recreational vehicle having a saddle 14 on its top surface near its rear end. Also shown is the elbow bracket 16 having a top end and a quick connect clamp 18 on its lower end for attachment to the sewer pipe 24 and an insert conduit 20 having a gasket 22 thereon for insertion into a extension conduit or coupling 34 which is then inserted into the at grade sewer pipe 24 inlet and also showing grade 32. The sewer pipe 24 requires a coupling 34 since it is at grade 32. Shown on the top of bracket 16 is a threaded rod 26 having a knob 28 thereon for turning it to adjustably bias 14 against elbow 12 and a set screw 30 for tightening the knob onto the threaded rod.

We claim:

1. An apparatus for connecting a sewer hose from a recreational vehicle to an above grade sewage inlet pipe, comprising:

a) an elbow conduit having a first substantially horizontal portion and a second substantially vertical portion, said first portion having a first end for connection of the end of the sewer hose from the recreational vehicle and a rear end which turns downwardly to form an elbow and to join said second portion, said first portion having a top surface; said second portion having a first end;

b) an elbow bracket having a first substantially horizontal portion having a first end and a top and bottom surface, said elbow bracket having a second substantially vertical portion having a first end and a front and rear surface, said first portion of said elbow bracket having a vertically threaded aperture therein adjacent said first end thereof, said second portion having a slot therein adjacent said first end thereof;

c) a saddle bracket disposed contiguous said top surface of said first portion of said elbow conduit between said elbow conduit and said bottom of said first portion of said elbow bracket, said saddle bracket having a top and bottom surface;

d) a threaded member having first and second ends being rotatably insertable into said threaded aperture of said elbow bracket so that said first end of said threaded member contacts said top surface of said saddle bracket to adjustably bias said saddle bracket against said elbow bracket;

e) an insert conduit having first and second ends, wherein said second end of said insert conduit is insertable into the sewage inlet pipe, a flange disposed on said first end of said insert conduit, wherein said flange is sized to mate to the end of the sewage inlet pipe, wherein said first end of said second portion of said elbow conduit connects to said first end of said insert conduit to form a fitting so that sewage can flow through said elbow conduit and then through said insert conduit into the sewage inlet pipe; and, f) a clamp extending through said slot in said elbow bracket and around the sewage inlet pipe so that the elbow conduit is secured to the above grade sewage inlet pipe.

2. The apparatus of claim 1, further comprising a gasket disposed between said flange of said insert conduit and the end of the sewage inlet pipe to permit a substantially leakproof seal between said insert conduit and the end of the sewage inlet pipe.

3. The apparatus of claim 2, further comprising a knob disposed on said second end of said threaded member to permit the threaded member to be turned by hand.

4. The apparatus of claim 3, wherein said clamp is a quick connect clamp.

5. The apparatus of claim 4, wherein the apparatus connects a sewer hose from a recreational vehicle to an at grade sewage inlet pipe, further comprising an extension conduit having first and second ends, said first end for receiving said second end of said insert conduit, said second end of said extension conduit being insertable into the at grade sewage inlet pipe.

* * * * *